United States Patent [19]

Heckethorn

[11] 4,265,005
[45] May 5, 1981

[54] U-BOLT CLAMP SADDLE CONSTRUCTION

[75] Inventor: John E. Heckethorn, Dyersburg, Tenn.

[73] Assignee: Heckethorn Manufacturing Company, Dyersburg, Tenn.

[21] Appl. No.: 796,217

[22] Filed: May 12, 1977

[51] Int. Cl.$^3$ .................. B65D 63/00; F16L 33/10
[52] U.S. Cl. .................................................. 24/277
[58] Field of Search ............... 24/277, 276, 135 L, 24/275, 284; 403/398, 399; 248/62; 339/265 R, 233, 265 E; 285/199

[56] References Cited

U.S. PATENT DOCUMENTS

| | | | |
|---|---|---|---|
| 1,799,360 | 4/1931 | Fekete | 403/398 |
| 2,719,345 | 10/1955 | Riker | 24/277 |
| 3,605,214 | 9/1971 | Spotts | 24/277 |
| 3,729,782 | 5/1973 | Downing | 24/277 |
| 3,879,815 | 4/1975 | Dowling | 24/277 |
| 3,955,250 | 5/1976 | Heckethorn | 24/277 |
| 4,040,152 | 8/1977 | Gilgallon | 24/277 |

FOREIGN PATENT DOCUMENTS 785128 10/1957 United Kingdom .................. 403/399

*Primary Examiner*—Roy D. Frazier

*Attorney, Agent, or Firm*—Dennison, Meserole, Pollack & Scheiner

[57] ABSTRACT

A saddle for a U-bolt clamp is formed of a pair of tubular housings arranged to receive and slide axially upon the legs of a U-bolt having a semicircular bight, with the housings connected by a web portion consisting of a pair of parallel planar sections of sheet steel welded together in full face contact and extending transversely between the housings integral therewith. The upper (bight facing) edge of each planar section is curved as a semicircular recess on the radius of the U-bolt bight. The mid portion of each planar web section is, for its entire length between the tubular housings, embossed with deep ribs to provide web stiffeners materially reinforcing the entire web portion of the saddle. The lower edge of each web section is formed with an outturned lateral flange over its full length, which flange lies in a plane normal to the longitudinal axes of the tubular housings and additionally reinforces the web section against horizontal distortion and twist when securing nuts threaded on the ends of the U-bolt legs are drawn up against the lower end faces of the tubular housings to tighten the clamp. The flanges add about 50% more metal to the web area at its narrowest point.

6 Claims, 10 Drawing Figures

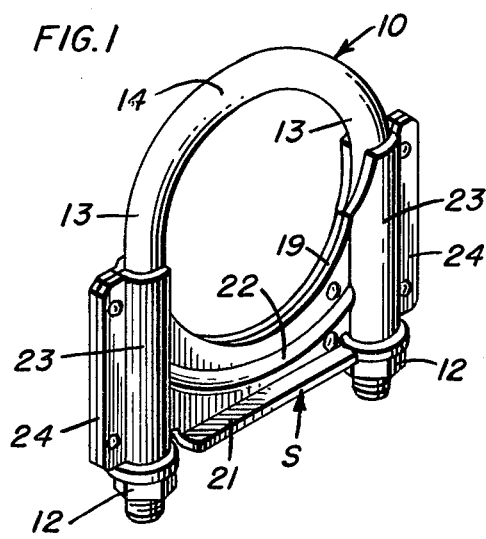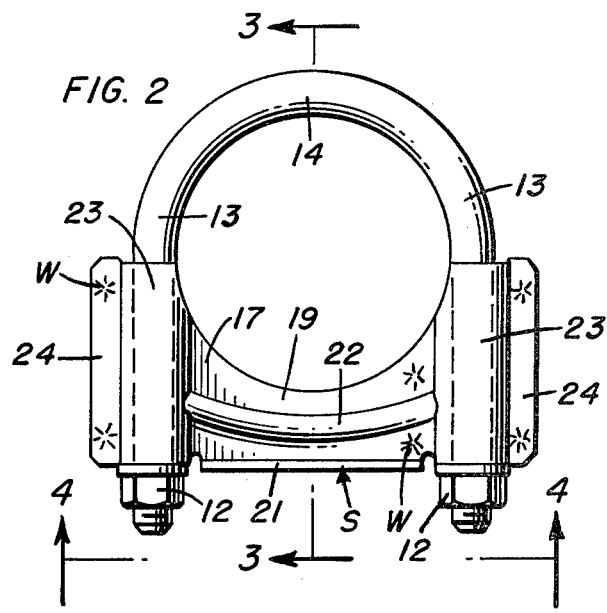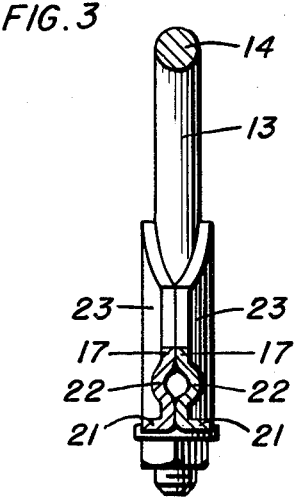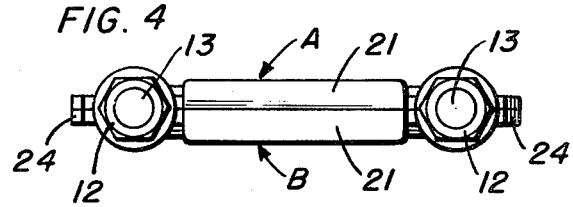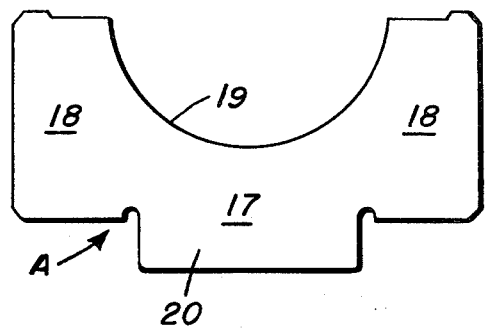

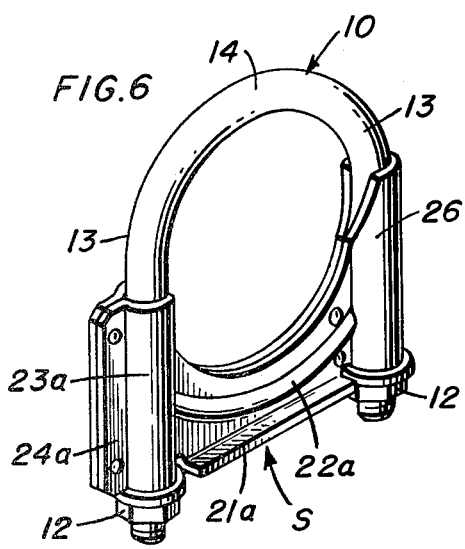
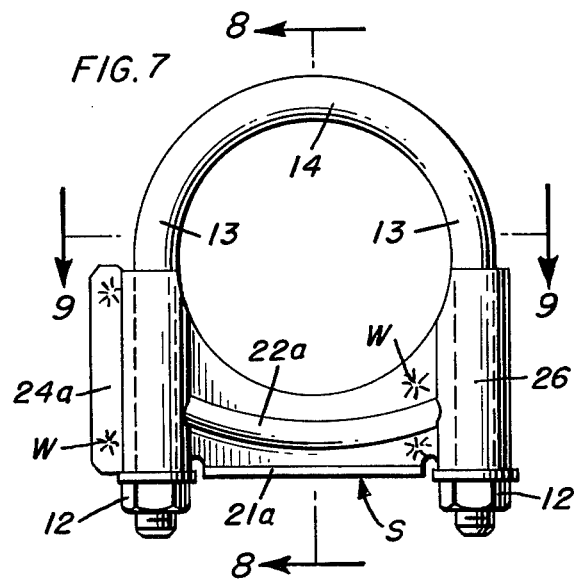
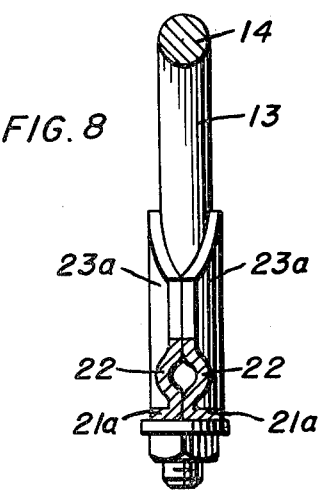
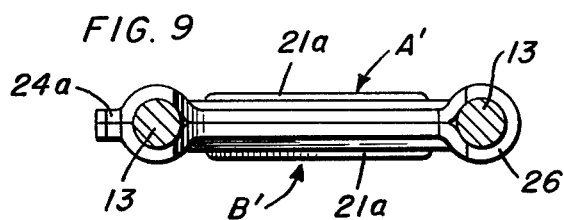
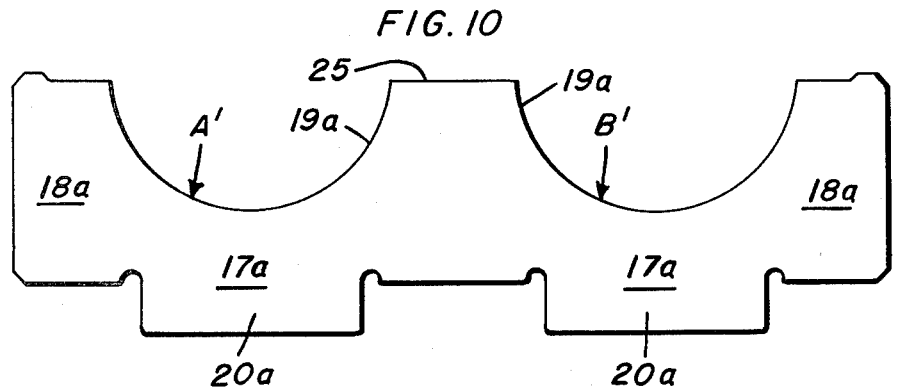

U-BOLT CLAMP SADDLE CONSTRUCTION

CROSS REFERENCE

This application is directed to an invention related to the subject invention of U.S. Pat. Nos. 3,772,745 and 3,995,250.

BACKGROUND

The field of the present invention is the art of U-bolt saddle clamps employed for example in the exhaust systems of automobiles and trucks powered by internal combustion engines.

The prior art directly concerned with such clamps is for the most part derived from a basic assembly comprising a U-bolt having a semicircular bight portion integrally connecting a pair of parallel legs which mount in axially slidable relation a sheet steel saddle member including tubular portions receiving and housing the bolt legs and connected by a central web extending transversely between the tubular housings integral therewith. The saddle has a work engaging edge facing and curved on the radius of the U-bolt bight. The free end portions of the bolt legs are threaded for reception of securing nuts that are drawn up against lock washers interposed between the nuts and adjacent ends of the tubular housings to advance the saddle and clamp together a coupling of telescoped cylindrical tubes disposed between the bight of the U-bolt and the curved edge of the saddle member.

Typical examples of prior art clamp structures most closely approaching the present invention are U.S. Pat. No. 2,719,345 to W. F. Riker and U.S. Pat. No. 3,137,053 to N. J. Osborn et al. Clamps of the types illustrated in these patents and in aforesaid U.S. Pat. No. 3,772,745 to William E. Dowling et al and 3,955,250 to Heckethorn have saddles formed from initially planar oblong blanks of relatively thin sheet steel. These are cut, stamped, and rolled or otherwise formed to provide a central web integrally connecting a pair of tubular portions arranged to slide axially on the legs of an associated U-bolt. In some cases the saddle web is only a single sheet; in others, such as Heckethorn, the web is constituted of a pair of identical sheets joined in parallel in full face contact relation or in laterally spaced relation with or without an identical intermediate spacer sheet.

In all cases the work engaging edge of the saddle web is required to impart sufficient clamping pressure to indent a semicircular bead in both the inner and outer sections of a telescoped tubular conduit coupling to which the clamp is applied. The applied clamping pressure is a function of the torque level to which the securing nuts are finally tightened when they are drawn up on the threaded ends of the U-bolt legs. Tests have clearly shown that in clamps of the foregoing general types, the saddle webs which have no longitudinal reinforcement usually start to twist laterally and roll over when tightened to torque levels in the vicinity of 16 foot lbs. Clamp saddles longitudinally reinforced in the manner disclosed in aforesaid Dowling et al U.S. Pat. No. 3,772,745 successfully resist such twisting and rolling at much higher torque levels, such as 40 foot lbs. However, in the present stage of the automotive industry, there is an increasing demand for clamps having a much greater clamping ability, especially those designed to meet certain critical requirements in connection with anti-pollution catalytic devices on new vehicles, which must withstand torque levels of 50 foot lbs. and higher. The Heckethorn clamp as noted in U.S. Pat. No. 3,955,250 was designed to meet these requirements.

While the aforesaid Heckethorn patent meets all strength requirements, there still exists a need for a clamp of somewhat lesser strength for lighter duty usage which will still withstand relatively high compressive or tensile stresses, yet do so at a lower cost per clamp and be of lighter weight.

SUMMARY OF THE INVENTION

A U-Bolt clamp system made with a saddle of the present invention will successfully withstand torque levels higher than comparable prior art clamps of the same size and weight and yet due to the new embossed arcuate rib design and edge flanges, will provide sufficient reserve strength to meet service conditions that may require clamping ability higher than normally found in heavy duty installations. The new clamp saddle is fabricated of two thicknesses of low carbon, high strength sheet steel with embossed web stiffener ribs and twist resistance in the form of outwardly turned reinforcing flanges or tabs.

DESCRIPTION OF THE DRAWINGS

FIG. 1 is a perspective view of a preferred form of the present invention as service-assembled with a conventional U-bolt.

FIG. 2 is a side elevation thereof.

FIG. 3 is a sectional view on the line 3—3 of FIG. 2.

FIG. 4 is a bottom plan view from line 4—4 of FIG. 2.

FIG. 5 is a plan view of the blank from which the saddle of FIG. 2 is formed.

FIG. 6 is a perspective view of an alternative embodiment of the invention.

FIG. 7 is a side elevation thereof.

FIG. 8 is a sectional view on line 8—8 of FIG. 7.

FIG. 9 is a sectional view on line 9—9 of FIG. 7.

FIG. 10 is a plan view of the blank from which the saddle of FIG. 7 is formed.

DETAILED DESCRIPTION

In both forms of the invention a complete clamp assembly comprises a U-bolt 10 mounting a saddle S and a pair of securing nuts 12 with integral flanges which engage the bottom edge of the saddle body. The nuts are threaded on the free end portions of the legs 13 of the bolt. These legs extend in parallel relation from the semicircular bight portion 14 of the U-bolt. The saddle is slidable axially on the bolt legs.

The invention intrinsic in the specific embodiments herein disclosed resides in the structure and arrangement of the clamp saddle member itself. The saddles are formed from initially planar, thin, oblong sheet steel blanks of low carbon high strength 15 gage (0.067") steel. This steel can be severely formed in the saddle web area and welds beautifully; it provides considerably extra strength with ease of stamping, forming and welding. The saddle member of the preferred embodiment is constituted of two such blanks resistance welded together as an integral body unit; the saddle member of the alternative embodiment is constituted of a single blank doubled upon itself as will be further apparent.

In the preferred form of the invention, illustrated in FIGS. 1–5, the body of the saddle S is constituted of a pair of identical blanks A and B having the initial configuration shown in FIG. 5 with a central web portion 17 and intermediate opposite end sections 18 whose top and bottom ends are parallel to each other and to the longitudinal axis of the blank. The bottom end faces of the sections 18 lie in a plane common thereto and which defines the bottom edge of the saddle when the blank is processed to its final form. The top edge of the blank is formed with a semicircular recess 19 curved on the radius of the semicircular bight of a U-bolt on which the saddle is to be mounted in service. This recess terminates at its end in the plane common to the top ends of the sections 18. In the initial planar form of the blank the bottom edge portion of the central web 17 is extended downwardly in the plane of the web to provide a tab 20 which is bent outwardly to provide a reinforcing flange 21 over substantially the entire length of web 17 between the bottom ends of the section 18. This flange 21 extends at a right angle to adjacent planar face of the central web 17 and greatly reinforces the web against distortion and roll over when subjected to the force generated by high level torque incident to tightening of a clamp in which the saddle is employed in service. Yet an additional web stiffener is provided for the central web 17 by embossing deep arcuate ribs 22 on the inner faces thereof. These ribs may extend into the bolt housings 23 to provide reinforcement of the web/bolt opening interface.

The bolt housings are formed in the following manner. Each end section 18 of the saddle blank is stamped to form a semicircular offset portion 23 extending from top to bottom of its section on an axis normal to the longitudinal axis of the blank. These offsets 23 extend from the same side of the blank as the flange 21 and are located intermediate the ends of the tab and the outer end edges of the blank, leaving a flat lip 24 between the semicircular portion 23 and the adjacent end edge of the blank. In the preferred embodiment the body of the saddle is constituted of two such identically formed blanks spot welded together by projection resistance welding in coincident parallel relation, with their offset portions 23 in registry and thereby forming a pair of cylindrical tubular housings for receiving in axially slidable relation the legs 13 of a U-bolt on which the saddle is mounted. The interface plane of the two blanks is common to the interface of the end lips 24 and bisects the cylindrical tubular housings formed by registry of the semicircular offsets 23.

The alternative embodiment of the clamp saddle illustrated in FIGS. 6-10 is formed from an initially planar, oblong blank of the same sheet steel from which the blank of the preferred form is made, but in the configuration shown in FIG. 10; it is, in fact, an integral end to end combination of two blanks of the configuration of the blank of FIG. 5.

With reference to FIG. 10, it will be seen that the blank comprising the saddle S is formed with a middle portion 25, two side portions A' and B', web portions 17a connecting opposite end sections 18a with the middle portion 25, and reinforcement tabs 20a extending from the web portions 17a. The top edges of the web portions 17a are formed with semicircular recesses 19a which terminate at their ends in the plane common to the top ends of the end sections 18a and the middle portion 25. As in the preferred embodiment, the reinforcement tabs 20a are folded or bent outwardly to provide flanges or lips 21a which extend at a right angle to the adjacent planar faces of the web portions 17a, and like their counterparts 21 in the preferred embodiment, greatly reinforce the webs against distortion and roll over. Similarly embossed arcuate ribs 22a are formed as in the preferred embodiment.

Each end section 18a of the saddle blank is stamped to form a semicylindrical offset 23a extending from top to bottom of its section on an axis normal to the longitudinal axis of the blank and, as in the preferred embodiment, they extend laterally from the same side of the blank as the flange 22a, leaving a flat lip 24a between the offset 23a and the adjacent end edge of the blank.

When the blank is shaped to final form the middle portion 25 is rolled to form a cylindrical tubular housing 26 for encompassing in axially slidable relation one leg 13 of a U-bolt on which the saddle is to be mounted in service. The body of the blank is folded flatly back upon itself, pivoting on the axis of the housing 26, to bring the open faces of the semicylindrical offsets 23a in registry and thereby form a cylindrical tubular housing for receiving in axially slidable relation the other leg 13 of the U-bolt. This folding of the blank provides the body of the saddle with the two identical and coincident side portions A' and B' as best seen in FIG. 9. These side portions and lips 24a are in full face contact over the entire area of their inner faces on an interface plane that bisects the cylindrical housings formed by the offsets 23a and the housing 26.

OPERATION

In both embodiments of the invention, when the saddle is mounted on the legs of a U-bolt with a telescoped coupling of two pieces of metal tubing disposed between the semicircular recess in the top edge of the saddle web and the bight of a U-bolt, the clamp is tightened by drawing up rotation of the securing nuts 12 to advance the saddle axially along the bolt legs to compress the coupling and indent a circular bead therein and provide a fluid tight seal over the full 360 degrees of the joint. The greater the total thickness of a telescoped coupling, the higher will be the torque required to draw up the securing nuts so that the clamp will indent a fully leak proof bead in the coupling.

I have found that the saddles employed in clamps of the general types of the patents hereinbefore noted with the exception of Heckethorn, are incapable of withstanding high torque levels because at such levels the saddle webs begin to twist laterally and roll over at their junctions with the bolt leg housings. At that point further tightening is impossible. The tendency to twist and roll has always been a problem in the industry which heretofore has sought to solve the problem by using thicker and heavier sheet metal for the saddle webs and by welding together a pair of parallel web sections with or without a spacer plate in between, thus increasing the saddle thickness over the web area. Such expedients have not provided a satisfactory solution of the problem. The saddle webs lack adequate reinforcement to prevent collapse at nut torquing levels above 40 foot lbs. Clamp saddles of the present invention will withstand higher levels of torque on each nut, giving a substantial increase of clamping ability. This is a very substantial advance in the art and is made possible by the stabilizing effect of the longitudinal reinforcement provided by the outturned tab flanges 21 and 21a and the embossed ribs 22 and 22a.

The new exhaust systems required by law on vehicles in this country have amplified exhaust system clamping problems due to increased back pressures, elevated temperature ranges, leakproof joint requirements, use of heavier guage tubing, and the requirement for a locking bead at the joint. My new saddle overcomes these problems and yet is less costly to produce and uses less material than the earlier clamp of U.S. Pat. No. 3,955,250.

What is claimed as new and intended to be secured by letters patent is:

1. A U-bolt clamp saddle body comprising a pair of substantially identical oblong planar sheet metal work-engageable webs welded together in parallel full face contact, a U-bolt leg receiving portion at each end of each web integral therewith, each web having a downwardly projecting lower edge portion folded outwardly to form a laterally outturned flange extending for substantially the entire length of the web intermediate said U-bolt leg receiving portions defining the lower edge of said saddle and parallel to the longitudinal axis of the web, both said flanges being in a common plane, the upper edge of each web defining a work engaging edge portion, and an outwardly projecting stiffener rib embossed on each web intermediate its upper edge and said flange and extending between said U-bolt leg receiving portions.

2. A U-bolt clamp saddle body as defined in claim 1, wherein the webs are part of a single blank, and are connected by a fold line at one end.

3. A U-bolt clamp saddle body as defined in claim 1, wherein said stiffener ribs are arcuate.

4. A U-bolt clamp saddle body as defined in claim 1, wherein said stiffener ribs extend into said U-bolt leg receiving portions of the webs.

5. A saddle for a U-bolt clamp comprising two thicknesses of sheet metal secured together in face-to-face relation by spot welding, said saddle having a central flat web provided with upright parallel tubular portions adjacent the laterally opposite ends thereof for slideably receiving the threaded legs of a U-bolt, the upper edge of said web between said tubular portions being of generally semicircular shape to encircle approximately one-half of the circular periphery of a pair of telescopically engaged tube sections, the lower edge of said web being defined by a pair of flanges turned outwardly in opposite directions from the plane of said web and extending substantially throughout the width of said web between said bolt-receiving portions, a portion adjacent the lower edges of the web being secured together by spot welding.

6. A saddle as called for in claim 5 wherein each flange projects outwardly from the plane of said web a distance equal to at least twice the thickness of each sheet metal section.

* * * * *